United States Patent
Rohde

(10) Patent No.: US 11,216,975 B2
(45) Date of Patent: Jan. 4, 2022

(54) HYBRID PHANTOM AND A METHOD FOR DETERMINING THE RELATIVE POSITION BETWEEN A THERMAL CAMERA AND A 3D CAMERA USING A HYBRID PHANTOM

(71) Applicant: Brainlab AG, Munich (DE)

(72) Inventor: Daniel Rohde, Garching (DE)

(73) Assignee: Brainlab AG, Munich (DE)

( * ) Notice: Subject to any disclaimer, the term of this patent is extended or adjusted under 35 U.S.C. 154(b) by 277 days.

(21) Appl. No.: 16/328,529

(22) PCT Filed: Jun. 20, 2018

(86) PCT No.: PCT/EP2018/066493
§ 371 (c)(1),
(2) Date: Feb. 26, 2019

(87) PCT Pub. No.: WO2019/048102
PCT Pub. Date: Mar. 14, 2019

(65) Prior Publication Data
US 2020/0394820 A1 Dec. 17, 2020

(30) Foreign Application Priority Data

Sep. 6, 2017 (WO) ................. PCT/EP2017/072360
Sep. 22, 2017 (WO) ................. PCT/EP2017/074069

(51) Int. Cl.
*G06T 7/80* (2017.01)
*G06T 7/73* (2017.01)
(Continued)

(52) U.S. Cl.
CPC .................. *G06T 7/80* (2017.01); *G01J 5/10* (2013.01); *G01S 7/4972* (2013.01); *G01S 17/86* (2020.01);
(Continued)

(58) Field of Classification Search
CPC ...... H04N 13/25; H04N 13/275; G06T 17/00; G06T 2207/10024; G06T 2207/10028
See application file for complete search history.

(56) References Cited

U.S. PATENT DOCUMENTS 8,933,974 B1 * 1/2015 Marason .............. G03B 21/147
345/690
9,201,499 B1 * 12/2015 Chang .................... G06F 3/017
(Continued)

OTHER PUBLICATIONS

J. Rangel et al.: "3D thermal Imaging: Fusion of Thermography and Depth Cameras", Proceedings of the 2014 International Conference on Quantitative Infrared Thermography, Jan. 1, 2014 (Jan. 1, 2014), XP055439844, DOI: 10.21611/qirt.2014.035 (Year: 2014).*
(Continued)

*Primary Examiner* — Obafemi O Sosanya
(74) *Attorney, Agent, or Firm* — Tucker Ellis LLP

(57) ABSTRACT

A hybrid phantom having marker patches that are visible both in a thermal image captured by a thermal camera and a 3D point cloud generated by a 3D camera. A thermal insulation between the marker, patches and a carrier part of the phantom maintains a temperature difference between the marker patches and the carrier part such that the marker patches are visible in the thermal image. Different optical properties of the marker patches and the carrier part make them distinguishable in the 3D point cloud.

11 Claims, 10 Drawing Sheets

(51) Int. Cl.
*G06T 7/521* (2017.01)
*G06T 7/12* (2017.01)
*H04N 5/247* (2006.01)
*H04N 17/00* (2006.01)
*G01S 7/497* (2006.01)
*G01S 17/894* (2020.01)
*G01S 17/86* (2020.01)
*G01J 5/10* (2006.01)
*G01J 5/00* (2006.01)

(52) U.S. Cl.
CPC .............. *G01S 17/894* (2020.01); *G06T 7/12* (2017.01); *G06T 7/521* (2017.01); *G06T 7/74* (2017.01); *H04N 5/247* (2013.01); *H04N 17/002* (2013.01); *G01J 2005/0048* (2013.01); *G01J 2005/0077* (2013.01); *G06T 2207/10028* (2013.01); *G06T 2207/10048* (2013.01); *G06T 2207/10152* (2013.01); *G06T 2207/20056* (2013.01); *G06T 2207/30204* (2013.01); *G06T 2207/30244* (2013.01)

(56) References Cited

U.S. PATENT DOCUMENTS 9,726,967 B1* 8/2017 Harrison .............. G06F 1/1626
9,870,056 B1* 1/2018 Yao ...................... H04N 9/3185
2017/0103510 A1* 4/2017 Wang ........................ G06T 7/38

OTHER PUBLICATIONS

International Search Report and Written Opinion corresponding to PCT/EP2018/066493, dated Jul. 25, 2018, 16 pages.
Rangel et al., "3D Thermal Imaging: Fusion of Thermography and Depth Cameras", Proceedings of the 2014 International Conference on Quantitative Infrared Thermography, Jan. 1, 2014, 10 pages.
Ouellet et al., Precise Ellipse Estimation Without Contour Point Extraction, Machine Vision and Applications, Springer, Berlin, DE, vol. 21, No. 1, May 7, 2008, pp. 59-67.
Jaramillo et al., "6-DoF pose localization in 3D point-cloud dense maps using a monocular camera", 2013 IEEE International Conference on Robotics and Biometrics ROBIO), IEEE, Dec. 12, 2013, pp. 1747-1752.
Hofer et al., "Infrared Deflectometry for the Inspection of Diffusely Specular Surfaces", Adv. Opt. Techn. 2016, Dec. 8, 2016, pp. 377-387.
MJ Services (GB) Ltd., "Thermbright Thermal Targets vs Conventional Thermal Targets", http://www.thermbright.com/thermal-targets/benefits-a-comparison; Jul. 14, 2017, 2 pages.

* cited by examiner

HYBRID PHANTOM AND A METHOD FOR DETERMINING THE RELATIVE POSITION BETWEEN A THERMAL CAMERA AND A 3D CAMERA USING A HYBRID PHANTOM

RELATED APPLICATION DATA

This application is a National Phase Application of International Application No. PCT/EP2018/066493 filed Jun. 20, 2018, which claims benefit of International Application No. PCT/EP2017/072360 filed Sep. 6, 2017 and International Application No. PCT/EP2017/074069 filed Sep. 22, 2017.

TECHNICAL FIELD

The present invention relates to a hybrid phantom, a system, a method for determining the relative position between a thermal camera and a 3D camera using the hybrid phantom, to a corresponding computer program and a computer.

SUMMARY

There are scenarios in medical applications in which two different cameras are used. The first camera is a thermal camera. A thermal camera senses thermal energy and outputs a thermal image. The thermal image typically is a grayscale image or a false color image and consists of a multitude of pixels, wherein the color or gray value of each pixel of the thermal image corresponds to the thermal energy of the radiation imaged by said pixel. The thermal image is for example a 2D image. The second camera, such as a Time-of-Flight (ToF) or a structured light camera, generates a 3D point cloud by emitting light onto an object and analyzing the reflected light.

It might then be necessary to know or determine the calibration between the two cameras. The calibration means the relative position between the two cameras and is also referred to as a set of extrinsic parameters. Contrary to that, intrinsic parameters of a camera describe how incoming radiation, such as light, is processed, for example using an optical system or a wave guide system, and converted into an electrical output signal. The intrinsic parameters for example describe the focal length and aberrations introduced by a camera.

In this document, the term "position" means a combination of an orientation given in up to three rotational dimensions and or a location given in up to three translational dimensions.

In the present invention, the relative position between the cameras is determined by imaging a hybrid phantom using both cameras and analyzing the output data of the two cameras. In this document, the hybrid phantom is also simply referred to as phantom. The phantom has particular properties such that markers being part of the phantom can be recognized both in the output image of the thermal camera and in the 3D point cloud output by the second camera.

The hybrid phantom, the system, the method, the program and the computer are defined by the appended independent claims. Advantages, advantageous features, advantageous embodiments and advantageous aspects of the present invention are disclosed in the following and contained in the subject-matter of the dependent claims. Different advantageous features can be combined in accordance with the invention wherever technically expedient and feasible. Specifically, a feature of one embodiment which has the same or a similar function to another feature of another embodiment can be exchanged with said other feature, and a feature of one embodiment which adds an additional function to another embodiment can in particular be added to said other embodiment.

The present invention relates to a hybrid phantom to be used for determining the relative position between a first camera and a second camera, wherein the first camera is a thermal camera which captures a thermal image of the hybrid phantom, the second camera emits light onto the hybrid phantom and analyzes the reflected light, thus generating a 3D point cloud representing points on the surface of the hybrid phantom.

The second camera is, for example, a Time-of-Flight (ToF) camera or a structured light camera. A ToF camera measures the time required by a light signal to travel to the phantom and back to the camera. In this document, the expression ToF camera comprises any suitable LiDAR apparatus. A structured light camera projects known light patterns onto the phantom and analyzes the reflected light to create the 3D point cloud.

The hybrid phantom has a carrier part which carries a plurality of marker patches, at least a part of the carrier part has one of a first property and a second property, the marker patches are made of solid matter and have the other one of the first property and the second property, wherein the first property is being reflective for the light emitted by the second camera, thus reflecting light omitted by the second camera back to the second camera, and wherein the second property is reflecting less of the incident light emitted from the second camera than the first property, and there is a thermal insulation between the marker patches and the carrier part. The property of the carrier part is subsequently referred to as carrier property and the property of the marker patch is subsequently referred to as marker property.

In this document, the word "solid" in the expression "solid material" means the aggregation state. This means that the marker patches are tangible and do not consist of a gas, such as air. A solid material can for example be rigid, soft or elastic.

A marker patch constitutes a marker, such that those expressions are used synonymously unless stated otherwise. The location of a marker patch, or a marker, is the location of the geometric center or the center of mass of the marker patch. Each marker patch has a boundary which defines its shape.

In one embodiment, the whole carrier part has the carrier property. In another embodiment, all areas of the carrier part which surround a marker patch have the carrier property. In one embodiment, the whole marker patch has the marker property. The whole carrier part or marker patch having a property for example means that the whole (outer) surface of the carrier part or the marker patch has the property.

The carrier part carrying a marker patch for example means that the marker patch is placed on, for example glued to, the surface of the carrier part or that the marker patch is embedded into the surface of the carrier part.

With the first and second property being different, it is possible to detect the marker patches in the image captured by the second camera. The thermal insulation causes the thermal absorption and radiation of the carrier and the marker patches to be different with no or only limited heat conduction between the marker patches and the carrier part, such that the marker patches can be detected in the thermal image output by the thermal camera. The limited heat conduction causes a sharp thermal contrast at the boundary of the marker patches since there is no thermal halo around the marker patches.

In the following, the term "first surface" means the one out of the surface of the carrier part or the surface of the marker patches which has the first property and the term "second surface" means the one out of the surface of the carrier part or the surface of the marker patches which has the second property.

Being reflective for the light emitted by the second camera for example involves being diffuse reflective for the light emitted by the second camera, thus reflecting light emitted by the second camera back to the second camera. Diffuse reflection means that incoming radiation is reflected at more than one angle, unlike specular reflection, in which incident radiation is reflected at a single angle which is symmetrical to the incident angle with respect to the surface normal. This means that the second camera can capture the light reflected by the phantom for any orientation, or at least a range of orientations, of the phantom relative to the second camera. The second camera can then determine points on the diffuse reflective surface.

The second property of being less reflective than the first property can for example be achieved by the second surface having a color which is darker than the color of the first surface, in one embodiment, the second surface is non-reflective for the light emitted by the second camera. In this document, "reflecting less" may mean that a surface having the second property has a reflectivity less than 50%, 25%, 10% or 5% of the reflectivity of a surface having the first property.

The second surface is considered to be non-reflective if the amount of reflected light energy is below a predetermined threshold, such as 15%, 10%, 5%, 3%, 2% or 1%. A non-reflective surface can for example absorb (most of) the incident light. In one example, the second property includes being absorbing with an absorption coefficient of at least 0.5 in at least a part of the wavelength range from 620 nm to 4 μm.

A non-reflective surface could also be a specular reflective surface. A specular reflective surface does not reflect light emitted by the second camera back to the second camera for almost all positions of the phantom relative to the second camera except for a very small range of relative positions, and those relative positions can be avoided when the phantom is used for determining the relative position between the first camera and the second camera.

The first and second properties for example only apply to the wavelengths used by the second camera to generate the 3D point cloud. This means that a second surface is allowed to reflect more energy of non-used wavelengths back to the second camera than a first surface.

In one example, reflecting incident light emitted from the second camera in the first property means a reflection with a reflection coefficient of 0.5 or more in the visible spectrum. This means that points on the second surface can be reliably detected by the second camera.

The carrier part can have a planar surface which carries the marker patches. The phantom can also have more than one planar surface. Besides the one or more planar surface(s), the phantom can have additional surfaces. A surface is considered to be planar if all points on the surface have a distance to a plane fitted through those points being below a predetermined threshold, such as an absolute threshold or a relative threshold. The absolute threshold can be, for example, 10 mm, 5 mm, 3 mm, 2 mm or 1 mm. The relative threshold can for example be a fraction of the square root of the area occupied by the surface points, such as $1/10$, $1/20$, $1/50$, $1/75$, $1/100$, $1/200$ or $1/250$.

With the phantom described above, the markers have sharp contours both in the thermal image and in the 3D point cloud. The first and second surfaces maintain a temperature difference due to the thermal insulation, such that the contours of the marker patches appear clearly in the thermal image over a period, of time. The 3D point cloud comprises points on the first surface, but points on a second surface are either not comprised in the 3D point cloud or have assigned an infinite distance to the second camera.

In one embodiment, the phantom further comprises a plurality of x-ray markers. An x-ray marker is visible in an x-ray image of the phantom. The x-ray markers are in known positions relative to the marker patches, such that the position of the x-ray imaging apparatus used for capturing the x-ray image can be determined relative to the first camera and/or the second camera. The x-ray markers can for example be metallic discs, which appear as ellipses in the x-ray image.

In one embodiment, the carrier part includes a patient fixation or immobilization unit which secures or immobilizes at least a part of a patient. Examples of such units are operating tables or head rests. Said unit for example carries a plurality of stickers, each sticker comprising at least a marker patch. Each sticker optionally further comprises a contrast part, the contrast part preferably surrounding the boundary of the marker patch and having the carrier property. The contrast parts are part of the carrier part.

A plurality of stickers attached to one or more objects in an operating room can be used as an ad-hoe phantom. In one embodiment, the stickers used for forming the ad-hoe phantom are attached to objects having a relative position which remains constant for a particular amount of time, such as the time needed to capture both the thermal image and the 3D point cloud. The ad-hoc phantom is for exampled constituted by stickers attached to an operation room table, which is also referred to as patient couch, and a device attached thereto, such as a head rest. The stickers could also be attached to a gantry of an imaging device.

In one embodiment, the thermal insulation is caused by a thermal insulator between the carrier part and the marker patches. There is thus a thermally insulating layer between the carrier part and the marker patches. Examples for suitable materials of the thermal insulator are polymers or ceramic foams. The thermal insulator can further have adhesive properties to hold, the marker patches on the carrier part. The thermal insulator can for example involve a thermally insulating glue.

In one embodiment, the thermal insulation is caused by the carrier part or the marker patches consisting of a thermally insulating material. Both the carrier part and the marker patches can consist of a thermally insulating material, either of the same or different thermally insulating material. There is thus no need for a dedicated thermal insulation between the marker patches and the carrier part.

In one example, the thermal insulation means a thermal conductivity of less than 0.25 W/(m*K), This sufficiently suppresses heat conduction from the marker patches into the carrier part or vice versa.

The marker patches have a thickness of for example 1 cm or less, such as 0.5 cm, 0.3 cm, 0.2 cm or 0.1 cm or less. This applies in particular, but not exclusively for marker patches being part of a sticker. In general, the marker patches can have any suitable thickness, for example if they are embedded into a phantom.

The marker patches can for example be made of foam or synthetic rubber, such as neoprene. The material of the marker patches can be colored to achieve the desired first or second property.

In one embodiment, the marker patches have a heat capacity different from the heat capacity of the carrier part. So the component, that is the carrier part or the marker patches, having the lower heat capacity adapts more quickly to the ambient temperature of the phantom than the other component. So if both components are brought to an initial temperature different from the ambient temperature, the component with the smaller heat capacity adapts faster to the ambient temperature than the other component. This results in a temperature difference between the carrier part and the marker patches which is detectable in the thermal image. The thermal insulation hinders temperature equalization between the marker patches and the carrier part.

In this document, the term "ambient temperature" means the air temperature at a location at which the phantom is used for determining the relative position between the first camera and the second camera. If the phantom is for example used, in an operating room, the ambient temperature is the air temperature in the operating room. If the air temperature in the operating room is not uniform, but spread over a temperature range, then the ambient temperature is a temperature within this range.

The present invention further relates to a system comprising the hybrid phantom as explained above, a first camera, a second camera and temperature difference generating means for generating a temperature difference between the marker patches and the carrier part of the hybrid phantom.

The first camera captures a thermal image of the phantom and the second camera generates a 3D point cloud representing points on the surface of the phantom. The temperature difference generating means causes a temperature difference between the marker patches and the carrier part of the phantom.

In one embodiment, the temperature difference generating means is a heating device comprising a chamber for accommodating the phantom. The inside of the chamber is heated, for example to a temperature above the ambient temperature. While being in the chamber, the temperature of the phantom approaches the temperature inside the chamber. If the carrier part and the marker patches approach this temperature with different rates, then a temperature difference between them occurs. The phantom can be removed from the chamber and used for determining the calibration. It is also possible that both the carrier part and the marker patches are heated to the same temperature before the phantom is removed from the chamber. In this case, the carrier part and the marker patches approach the ambient temperature at different rates, such that there is a temperature difference therebetween which can be detected in the thermal image of the thermal camera. The different rates can result from different heat capacities and/or different thermal emissivities of the carrier part and the marker patches.

In another embodiment, the temperature generating means is a cooling device comprising a chamber for accommodating the phantom. Its functionality is in analogy to the heating device, but it cools the phantom rather than heating it, however, the same effect of a temperature difference between the carrier part and the marker patches is achieved.

In yet another embodiment, the temperature difference generating means is a radiation source which emits radiation onto the phantom such that the radiation heats the phantom. The radiation source can for example be an infrared (IR) lamp, an ultraviolet (UV) lamp or any other suitable source of electromagnetic radiation. An IR lamp is also referred to as red light lamp and is for example an incandescent red light lamp. An IR lamp emits a lot of energy without a blinding light. It for example has a high radiation power or radiation power density. The carrier part and the marker patches heat at different rates, for example if they have different thermal emissivities in the spectrum of the radiation emitted by the radiation source, such that they are clearly distinguishable in the thermal image.

An advantage of the radiation source is that it can heat the phantom while it is in use for determining the relative position between the first camera and the second camera. Another advantage is that the radiation source can be controlled to emit radiation with varying intensity over time, such that the temperatures of the carrier part and the marker patches vary over time. Yet another advantage is that, if the marker patches have a larger thermal emissivity than the carrier part, only the marker patches heat up significantly, thus making the phantom less prone to thermal expansion.

With a thermal insulation between the carrier part and the marker patches, the radiation source can be weaker and/or farther away from the phantom than without the insulation. This reduces the thermal impact on other objects or persons near then phantom.

The materials of the marker patches on the one hand and the carrier part or the contrast part on the other hand for example differ in at least one of their thermal conductivity and their absorbing property regarding the radiation emitted by the radiation source. This increases the visibility of the marker patches in the thermal image captured by the first camera.

Examples for materials having a low thermal conductivity are foamed ceramics, fibrous inorganic materials, like glass wool or asbestos, fibrous organic materials, like paper or cardboard, foamed or solid polymers, like foamed neoprene, wood, like balsa wood, or textiles, like felt, wool, cotton, inorganic fiber weave or synthetic textiles such as nylon weave. The marker patches are for example made of material having low thermal conductivity.

As already explained, the materials of the marker patches on the one hand and the carrier part or the contrast part on the other hand differ the reflectivity for the light emitted by the second camera. This increases the visibility of the marker patches in the 3D point cloud captured by the second camera.

Different reflectivity can be obtained by applying paints, using pigmented materials or using naturally colored materials that absorb the light emitted by the second camera to a different degree. Suitable pigments might be soot. Naturally colored materials include carbon fiber textile and white polymer.

The present invention further relates to a method for determining the relative position between a first camera and a second camera used in a medical application. The first camera is a thermal camera which captures a thermal image of a hybrid phantom. The second camera emits light onto the hybrid phantom and analyzes the reflected light, thus generating a 3D point cloud representing points on the surface of the phantom. Details of the first camera, the second camera and the hybrid phantom are the same as described above.

The method of the present invention comprises the step of generating a temperature difference between the marker patches and the carrier part of the phantom. This can involve initially bringing the marker patches and the carrier part to different temperatures, for example by pre-heating the phantom, pre-cooling the phantom or by irradiating the phantom with energy, all to a point at which the temperatures are different. This could alternatively involve initially bringing the marker patches and the carrier part to the same temperature and waiting until their temperature differs. Different temperatures of the marker patches and the carrier part occur if they approach the ambient temperature from their initial temperature at different rates as explained above.

The method further comprises the step of capturing a thermal image of the phantom using the first camera. It further comprises the step of capturing a 3D point cloud of the phantom using the second camera. The 3D point cloud represents points at least on a surface of the phantom, either on the carrier part or the marker patches. The relative position between the first camera, the second camera and the phantom must not have changed between capturing the thermal image and the 3D point cloud. This can for example be achieved if the thermal image and the 3D point cloud are captured at the same time.

The method further involves the step of identifying an edge of each of the plurality of marker patches of the hybrid phantom in the thermal image. As explained above, the structure of the phantom causes a temperature difference between the carrier part and the marker patches as imaged in the thermal image, which can be identified as edges in the thermal image.

The method further involves the step of identifying the locations of the plurality of marker patches from the identified edges, thus generating thermal marker locations. The thermal marker locations are preferably defined by two coordinates in the thermal image.

The present method further involves the step of identifying the locations of the plurality of marker patches from the 3D point cloud, thus generating 3D marker locations. This identification uses the property that points on the second surface are identified as having a larger distance to the second camera than points on the first surface. If a particular point on the second surface does not reflect enough light back to the second camera, the distance of this point to the second camera is found to be large or even infinite. With the first and second properties of the marker patches and the carrier part as explained above, the shapes of the markers can also be identified in the 3D point cloud. Identifying the locations of the markers from the 3D point cloud thus obtains 3D marker locations of the markers in a reference system of the second camera. The locations of the markers for example represent the centers, such as the centers of mass, of the marker patches in space.

The present method further involves the step of determining the relative position between the first camera and the second camera from the thermal marker locations and the 3D marker locations. This can be done using any algorithm which finds a relative position between the cameras such that the 3D marker locations would be depicted in the thermal image at the thermal marker locations.

In one implementation, the relative position between the first camera and the second camera is determined by applying a Perspective-n-Points (PnP) algorithm on the thermal marker locations and the 3D marker locations.

The Perspective-n-Points algorithm finds a virtual position of the first camera relative to the second camera for which the markers at the 3D marker locations would result in locations of the markers in the thermal image of the first camera as represented by the thermal marker locations. Put differently, the location of a marker in the thermal image in combination with the intrinsic parameters of the first camera defines a line in space, relative to the first camera, on which the marker must lie. Any point on this line is imaged at the corresponding location in the thermal image due to the properties of the first camera. Now a relative position between the cameras has to be found such that the 3D marker locations lie on the lines in space corresponding to the thermal marker locations.

Given a set of 3D points (3 or more) and their corresponding 2D points and the camera matrix (K) of the thermal camera which is used for imaging the 2D points, the Perspective-n-Points algorithm determines the rotation (R) and translation (T) needed in the projection formula of the pin camera model:

$$sp_{2d}=K[R|T]p_{3d}$$

Where all the vectors and matrices are in their homogeneous form (this means with an added dimension having the value of 1 for the vectors, and a row of 0 and 1 for the matrix, wherein the 1 will go in the diagonal position). The camera matrix represents the intrinsic parameters used in the pinhole camera model. It has the focal length of the camera in pixels and the optical center in pixels as well. The camera matrix is parameterized as follows:

$$K = \begin{pmatrix} f_x & sk & x_0 \\ 0 & f_y & y_0 \\ 0 & 0 & 1 \end{pmatrix}$$

In this matrix, $f_x$ and $f_y$ are focal lengths, sk is the axis skew and $x_0$ and $y_0$ represent the principal point offset. Then s is the resulting scale, since the result will be of the form:

$$p_{2d} = \begin{bmatrix} x \\ y \\ w \end{bmatrix} s = \frac{1}{w}$$

And to be homogeneous, w should be equal to 1.

There are several solutions to find the extrinsic parameters ([R|T]) with the Perspective-n-Points algorithms. However, all the variants use the same inputs and will output the Extrinsic parameters (in some cases, an optimized camera matrix as well).

As an example, P3P uses only 3 points to create a system of equations, which will give 4 solutions, and then uses a 4th point to obtain a single solution and discard the rest.

EPnP uses at least 3 points (more points will yield better results in case the data is noisy), to generate several equations based on the sum of 4 weighted control points equal to the data points (4 for the 3D data and 4 for the 2D data), these equations are used to calculate the coefficients needed for the direct calculation of the extrinsic parameters.

In a final example, a system of equations is built out of the equation given before with all the points. Then, using a random or educated guess, it is then refined in an iterative way using gauss newton minimization (minimizing the re-projection error) or Levenberg Marquadt (minimizing the re-projection error as well).

In one embodiment, identifying an edge of a marker patch and identifying the location of a marker patch involve finding two or more edge pixels lying on the boundary of a marker patch, calculating a direction of a gradient for each found edge pixel and calculating the location of the marker patch from the directions of the gradients. Due to the imaged temperature difference at the boundary of the marker patch, there is a significant color change in the false color thermal image and a significant change in the gray value in a gray scale thermal image. An edge pixel is found, for example, by finding such a significant difference in neighboring pixels of the thermal image. At each edge pixel, the thermal image has a gradient, and the direction of the strongest gradient is typically perpendicular to the boundary of the marker patch. The direction of the gradient means the direction of the largest gradient of the edge pixel. Calculating the location of the marker patch from the directions of the gradients for example involves analyzing the intersections of straight lines running through the edge pixels and having the directions of the corresponding gradients. Details of this approach are described in the article "Precise ellipse estimation without contour point extraction" published in the Journal Machine Vision and Applications, Volume 21 Issue 1, October 2009, Pages 59-67.

In another embodiment, the location of a marker is identified, for example, based on the known shape of the marker patch. The shape of the marker patch, or of its projection into the image plane of the thermal image, is identified in the thermal image. For example, a plurality of edge pixels lying on the boundary of the marker patch are identified and an object having the shape corresponding to the shape of the marker patch is fitted into the edge pixels. If the marker patch is, for example, circular, the depiction of the marker patch in the thermal image is elliptical, and an ellipse is fitted into the edge pixels. A suitable algorithm for finding ellipses, which correspond to depictions of circular patches, in the thermal image is described in the paper "Precise ellipse estimation without contour point extraction" by Ouellet et al. The center of the fitted object then defines the thermal marker location.

In one embodiment, identifying the locations of the plurality of marker patches from the 3D point cloud, thus generating 3D marker locations, involves the step of calculating phantom position data describing the position of the hybrid phantom relative to the second camera from the 3D point cloud. In this step, the position of the phantom relative to the second camera is determined. The method of this step further involves the step of obtaining, or acquiring, marker data representing the locations of the marker patches on the hybrid phantom. The marker data can for example be acquired from a database in which the marker data are stored for one or more phantoms.

In this embodiment, the method further involves the step of calculating the location of each marker patch from the phantom position data and the marker data. Since the position of the phantom relative to the second camera and the locations of the marker patches on the phantom are known, the locations of the marker patches relative to the second camera can be derived therefrom.

In one embodiment, at least a part of the carrier part forms a planar surface on which the marker patches are formed. In this embodiment, the method can further involve rotating the 3D point cloud such that the planar surface, as represented by the rotated 3D point cloud, is perpendicular to the depth direction of the reference system of the second camera, thus obtaining a 2D view of the 3D point cloud. The depth direction is typically the z axis in the reference system of the second camera. In this context, the expression "2D view" means that all points in the 3D point cloud corresponding to the planar surface have the same depth to the second camera. The 2D view therefore does not comprise spatial deformations caused by the viewing direction of the second camera onto the phantom.

In this embodiment, the method can further involve the steps of identifying the locations of the markers in the 2D view, thus obtaining auxiliary marker surface locations, and of performing an inverse rotation of the auxiliary marker surface locations, thus obtaining the 3D marker locations. In the 2D view, the shape of a marker equals the actual physical shape of the marker patch. It is thus easier to find the markers in the 2D view. The inverse rotation is the inverse of the rotation applied to the 3D point cloud to obtain the 2D view. The found locations of the markers in the 2D view are thus transformed back into 3D space, thus forming the locations of the marker patches in the reference system of the second camera.

In one implementation of this embodiment, a plane is fitted into those points of the 3D point cloud which represent the planar surface. Then a transformation is calculated which describes rotations about axes perpendicular to the depth direction of the reference system of the second camera and which makes the plane perpendicular to the depth direction of the reference system of the second camera. This transformation is then applied to the 3D point cloud to obtain the 2D view and the inverse of the transformation is applied to the auxiliary marker surface locations, thus obtaining the 3D marker locations.

In one implementation, the method according to this embodiment involves the step of removing, from the 3D point cloud, those points which do not lie on the plane. This step can be performed before or after the 3D point cloud is rotated. A point is considered as lying on the plane if its distance to the plane is below a threshold, such as the absolute threshold or relative threshold mentioned above in the definition of the word "planar". With this step, the 3D point cloud is basically reduced to points lying on the planar surface.

In one implementation of this embodiment, the 21) view is a depth map of the rotated 3D point cloud. A depth map is a (virtual) 2D image in which the color of each pixel, or the grey value in a grey scale image, represents the distance of a surface point depicted by this pixel from the second camera. In this implementation, points on the first surface basically have the same color/grey value in the 2D view and points on the second surface have a significantly different color/grey value.

In one embodiment, a deviation value of the relative position between the first camera and the second camera is calculated and the steps of capturing a thermal image of the phantom, identifying an edge of each of the plurality of marker patches in the thermal image, identifying the locations of the plurality of marker patches from the identified edges, thus generating thermal marker locations, capturing a 3D point cloud of the phantom, identifying the locations of the plurality of marker patches from the 3D point cloud, thus generating 3D marker locations, and determining the relative position between the first camera and the second camera from the thermal marker locations and the 3D marker locations are repeated if the deviation value is above a predetermined threshold. With this approach, the confidence of the determined relative position is judged and the process is repeated if this confidence is not high enough.

In one implementation of this embodiment, the 3D marker locations are projected into the image plane of the first camera using the determined relative position between the two cameras and intrinsic parameters of the first camera. In other words, it is simulated at which locations the marker patches would be imaged in the thermal image, considering the found relative position and the imaging properties of the first camera. Then the distances between the locations of the markers of the projected 3D marker locations in the image plane and the locations of the corresponding markers found in the thermal image are calculated and the deviation value is calculated from said distances. In other words, the real locations of the markers in the thermal image are compared to the simulated locations. If the deviation value is above a predetermined threshold, the confidence is not high enough.

In one implementation, the deviation value is the root mean square of the distances, but any other suitable metric can be used.

In one embodiment, the method further involves the step of establishing a one-to-one correspondence between the markers represented by the thermal marker locations and the 3D marker locations. This facilitates the calculation of the deviation value.

One possible implementation asks for user input which identifies corresponding markers, for example in the thermal image and the 3D point cloud or in the thermal image and the 2D view of the 3D point cloud. The correspondence can also be established automatically. In one example, each marker comprises a unique identification which can be identified both in the thermal image and the 3D point cloud (or the 2D view of the 3D point cloud). The identification can be, for example, any one of a number, a shape or any other code.

In another implementation, the markers in both the thermal image and the 2D view of the 3D point cloud are ordered in a particular order, such as from left to right and from top to bottom. Since the marker patches must be visible to both cameras, the viewing directions of those cameras onto the phantom are on the same side of the phantom. The left-to-right arrangement of the markers in the thermal image and in the 2D view of the 3D point cloud is therefore identical. It is therefore only possible that the up-down directions of the thermal image and the 2D view of the 3D point cloud are inversed. However, this can typically be disambiguated automatically from the arrangement of the markers.

Another implementation can use prior knowledge about the positions of the markers on the phantom. This prior knowledge does not have to reflect the exact positions, but only the general arrangement of the markers. In this prior knowledge, every marker can have a unique identification.

In one embodiment, the temperature difference between the marker patches and the carrier part is generated by causing emission of thermal radiation onto the phantom, wherein the emission of the radiation is caused to have a varying intensity over time. The temperatures of the carrier part and the marker patches thus vary over time. In one example, the emission of the radiation is caused to vary periodically. This causes a periodicity in the temperatures of the carrier part and the marker patches.

The periodicity or frequency of the variation of the emitted radiation can depend on the image frequency of the first camera. The frequency of the variation is for example half of the image frequency of the camera or less. It can further depend on the properties of the phantom, in particular how fast the temperature of the carrier part and/or the marker patches rises or falls. If, for example, the thermal radiation is switched on and off according to a duty cycle, the "on" phase has a length such that the temperature rises from a first temperature, such as the ambient temperature, to a second temperature, such as an asymptotic temperature, and the "off" phase has a length such that the temperature falls from the second temperature to the first temperature. The lengths do not need to have to be exactly that long, but can be shorter or longer, such as +/−5%, +/−10% or +/−25%.

The periodicity of the variation of the emitted radiation can for example be in the range from 0.01 Hz to 50 Hz in the range from 0.02 Hz to 40 Hz, in the range from 0.05 Hz to 25 Hz, in the range from 0.1 Hz to 1.6 Hz or in the range from 0.1 Hz to 5 Hz, and can in particular be 0.1 Hz.

In this embodiment, a plurality of thermal images is captured over time and a Fourier transformation of the plurality of thermal images is performed, thus obtaining image data in the frequency domain. The plurality of thermal images is also referred to as a sequence of thermal images. The same pixel in the sequence of thermal images thus has a sequence of pixel values, like gray values or false color values. The sequences of pixel values of one or more pixels are Fourier transformed one by one to obtain the Fourier transform of the plurality of thermal images.

In this embodiment, a frequency filter is applied to the image data in the frequency domain, for example pixel-wise. This means that the Fourier transformed sequences of pixel values are filtered one by one. This does for example remove at least parts of the frequency components which are caused by noise, like sensor noise of the thermal camera. The frequency filter can be a low-pass filter, a high-pass filter or a band-pass filter.

In this embodiment, an inverse Fourier transformation is performed on the filtered image data in the frequency domain, thus obtaining filtered image data in the time domain. Like the Fourier transformation, the inverse Fourier transformation is performed pixel-wise.

In this embodiment, the edges of each of the plurality of marker patches are then identified in the filtered image data in the time domain. In one example, the edges are identified in the one of the plurality of thermal images in which the temperature difference between the carrier part and the marker patches is the highest.

In an alternative implementation, there is no inverse Fourier transformation. Instead, the sum of the amplitudes of the filtered frequency components in the frequency domain is calculated for each pixel and the result is used as the pixel value in the time domain. The sum can be a weighted sum or a non-weighted sum.

In one embodiment, the emission of the radiation is caused to have a periodic intensity over time with a predetermined frequency, the frequency filter comprises a low-pass filter and the cutoff frequency of the low-pass filter is set to the predetermined frequency or higher. This removes high-frequency noise from the sequence of thermal images. A high-pass filter with a suitable cutoff frequency below the predetermined frequency removes a constant component from the sequence of thermal images, like the one caused by the ambient temperature.

The method of the present invention for example uses the phantom for obtaining an initial calibration of the cameras. The initial calibration can be verified and/or updated at a later point in time, which is subsequently simply referred to as verification or live verification. The verification can use the same phantom or an ad-hoc phantom as described above. The advantage of the ad-hoc phantom for the verification is that existing structures in the field, of view of the two cameras can carry the stickers, such there is no need for placing a dedicated phantom. This might interrupt a medical workflow and/or be disadvantageous if a dedicated phantom is to be used in a sterile environment.

The present invention further relates to a program which, when running on a computer, causes the computer to perform the method as explained above and/or to a program storage medium on which the program is stored, in particular in a non-transitory form.

The present invention further relates to a computer on which the aforementioned program is stored and/or run.

Still further, the present invention relates to a system comprising a hybrid phantom as defined above, a first camera, a second camera and a computer as explained above.

In one embodiment, the system further comprises heating means for heating the hybrid phantom or cooling means for cooling the hybrid phantom. Heating means and cooling means can be as described above.

In the present invention, the thermal marker locations and the 3D marker locations are analyzed. Since those market data represent the same phantom, and therefore the same relative positions of the markers on the phantom, it is not necessary to know the exact arrangement of the markers on the phantom, which means that, for example, inaccuracies in the manufacture of the phantom are irrelevant.

Another advantage of the present invention is that is only requires one pair of a thermal image and a 3D point cloud. It is not necessary to capture a plurality of thermal images and/or generate a plurality of 3D point clouds, for example at different points in time or for different positions of the phantom. However, a sequence of thermal images might improve the calibration.

Definitions

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trade mark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The present invention can be used for the applicant's Radiotherapy and Image Guided Surgery devices where it enables a precise positioning and monitoring of patients.

BRIEF DESCRIPTION OF DRAWINGS

In the following, the invention is described with reference to the enclosed figures which represent preferred embodiments of the invention. The scope of the invention is not however limited to the specific features disclosed in the figures, which show.

DETAILED DESCRIPTION

Figure 1:
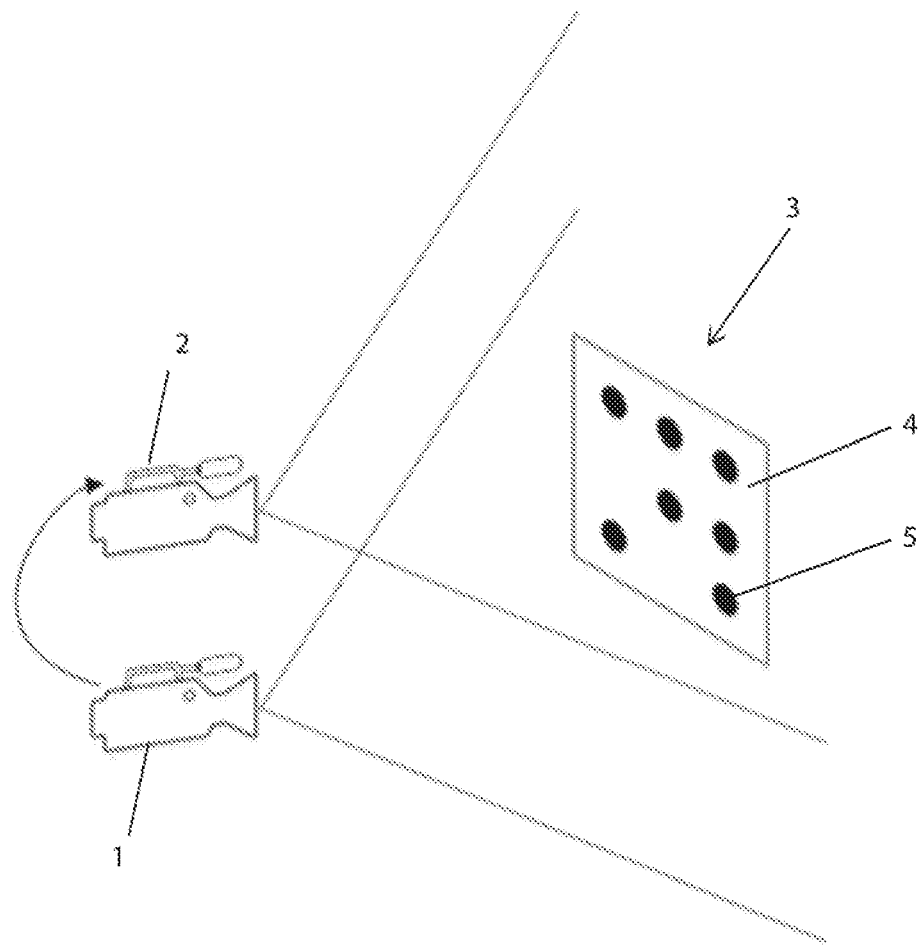
FIG. 1 a setup with two cameras and a phantom,
FIG. 2 a system according to the present invention,
FIG. 3 thermal energy irradiated onto the phantom,
FIG. 4 a flow chart including the present invention,
FIG. 5 a detailed flow chart of analyzing the thermal image.

FIG. 1 shows a setup of a first camera 1 and a second camera 2. The first camera 1 is a thermal camera which can capture a thermal 2D image of an object. The thermal 2D image is for example a grayscale image having a multitude of pixels, wherein the gray value of a pixel corresponds to the temperature of the surface of the object at a location imaged by that pixel. The second camera 2 is a structured light camera which can generate a 3D point cloud of the object by emitting a light pattern onto the object and analyzing the light reflected back to the camera.

If the output of both cameras 1 and 2 is to be used in a medical procedure, it is typically essential to know the relative position between the first camera 1 and the second camera 2. This relative position is also referred to as extrinsic parameter of the pair of cameras. It can also be understood as a transformation between the position of the first camera 1 and the second camera 2. It is indicated by the arrow in FIG. 1.

According to the present invention, the relative position between the two cameras 1 and 2 is not determined by tracking markers attached to the cameras. The relative position is rather determined by placing a hybrid phantom 3 in the field of view of both cameras and analyzing the output of the two cameras.

In general, the phantom 3 can have any shape. However, it must have a carrier part 4 and a plurality of marker patches 5. In the present example, the carrier part 4 is white and diffuse reflective, thus reflecting light emitted by the second camera 2 back to the second camera. The marker patches 5 are black. The marker patches 5 thus do not reflect light emitted by the second camera 2 back to the second camera 2, which means that it reflects for example less than 10 percent of the incident light emitted by the second camera 2. In the present example, the marker patches 5 are circular. However, they can have any other suitable shape. In this embodiment, the marker patches 5 are made of black neoprene and have a lower heat capacity than the carrier part 4.

The carrier part 4 has planar surface having a geometric size in terms of a surface area. The planar surface is considered to be planar if the distance of the points on the surface from a plane fitted, into those points is small compared to the surface area of the planar surface, and is, for example, smaller than 1/50 or 1/100 of the square root of the size of the planar surface.

Figure 2:
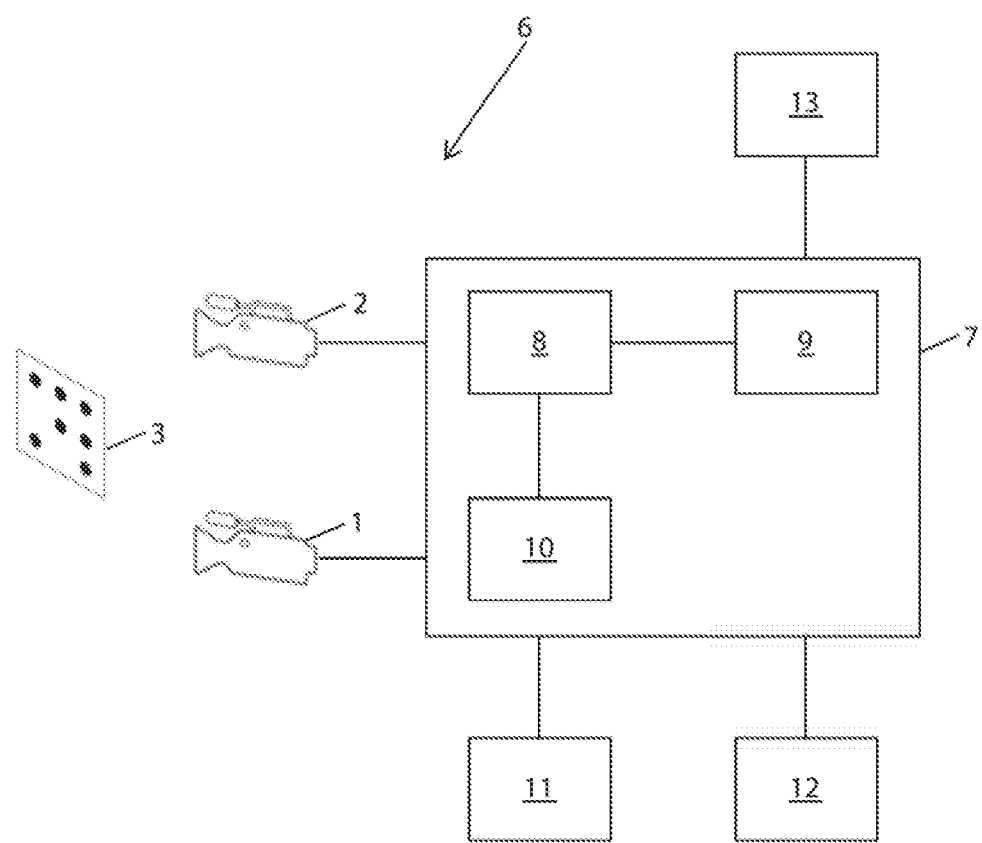

FIG. 2 shows a system 6 according to the present invention. The system 6 comprises the first camera 1, the second camera 2, the phantom 3 and a computer 7, which is connected to an optional input device 11, an optional output device 12 and an optional UV or IR lamp 13. The input device 11 is, for example, a keyboard, a mouse or a touch sensitive surface. The output device 12 is, for example, a monitor. The computer 7 controls the intensity of the thermal radiation emitted by the lamp 13.

The computer 7 comprises a central processing unit (CPU) 8, a memory unit 9 and an interface 10. Via the interface 10, the computer 7 is connected to the first camera 1 and the second camera 2.

The memory unit 9 stores program data comprising instructions for the CPU 8 such that it performs the data processing according to the present invention. It further stores data to be processed, such as the thermal image captured by the first camera 1 and the 3D point cloud generated by the second camera 2, and processed data.

Figure 3:
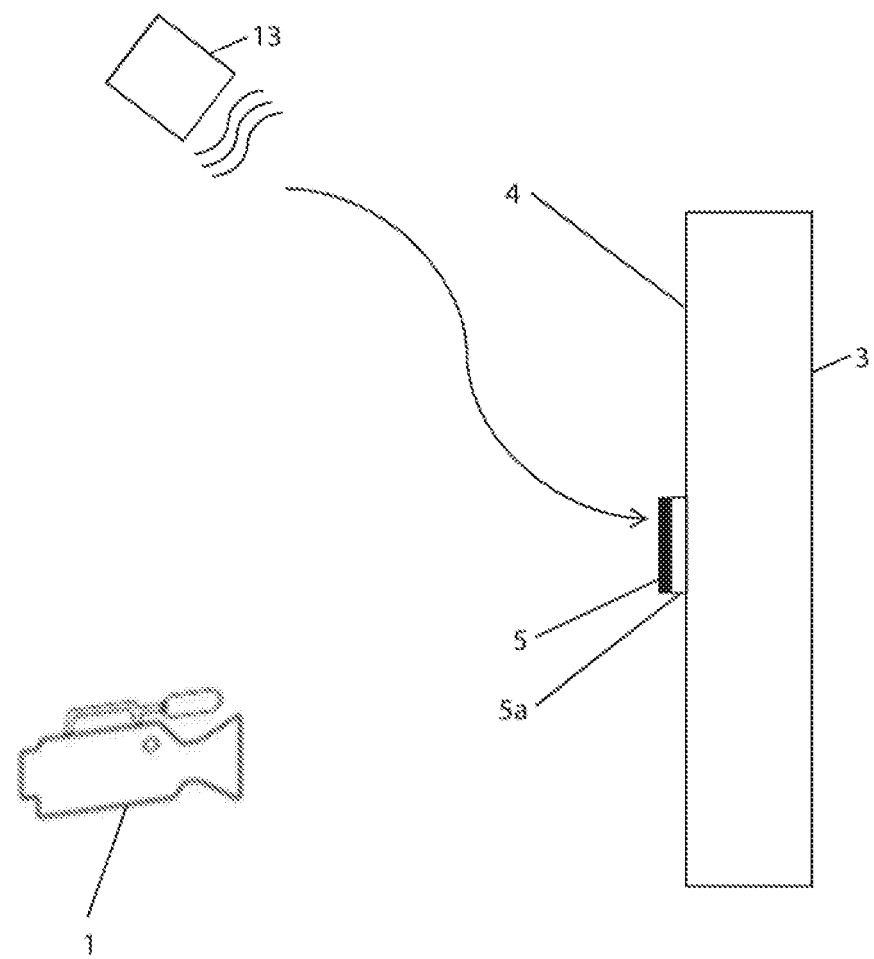

FIG. 3 shows more details of the hybrid phantom 3 and thermal radiation irradiated onto the phantom. The marker patches 5 are attached to the carrier part 4 via an insulation layer 5a. The insulation layer 5a causes a thermal insulation between the marker patches 5 and the carrier part 4, such that a temperature equalization between the carrier part 4 and the marker patches 5 is hindered. The insulation layer 5a may be adhesive such that the marker patches 5 hold on the carrier part 4. The insulation layer 5a can be omitted if the carrier part 4, the marker patches 5 or both are thermally insulating. FIG. 3 is not drawn to scale in order to emphasize the insulation layer 5a.

Figure 4:
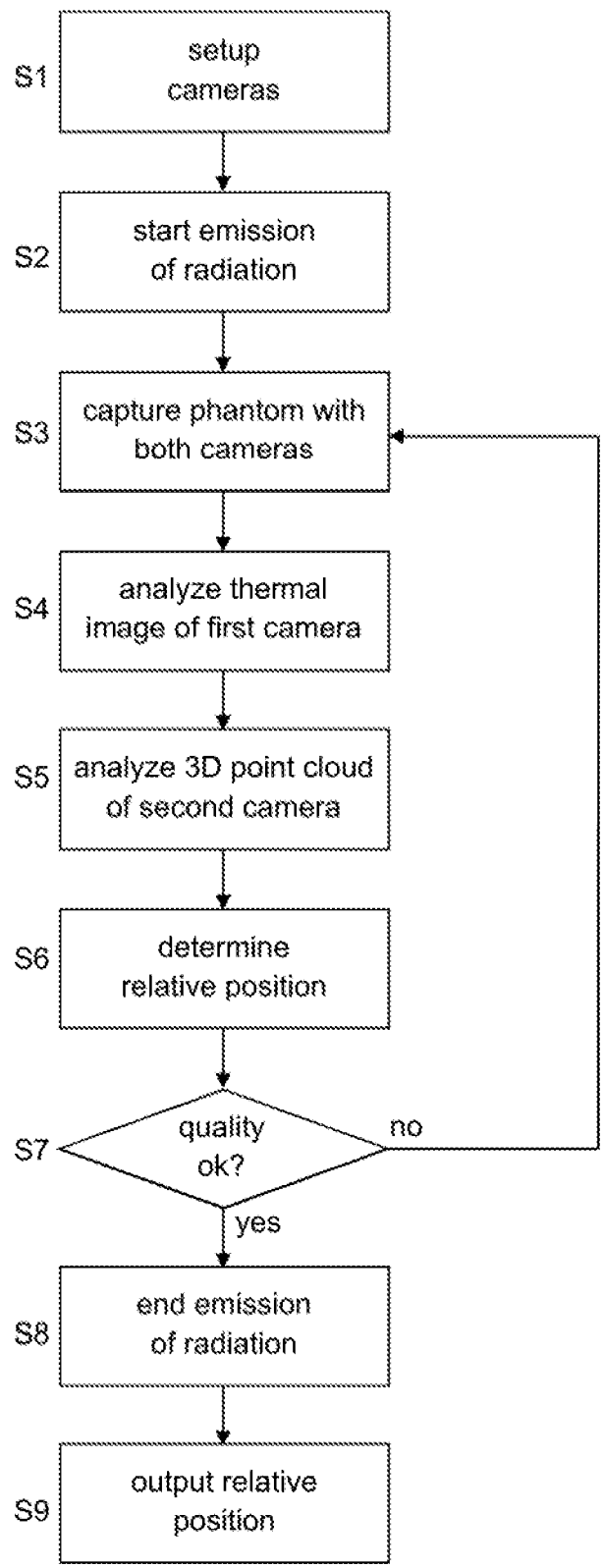

FIG. 4 shows a flowchart of a method including the present invention.

In step S1, the cameras 1 and 2 are set up. This means that the cameras are positioned as required for the medical procedure to be performed. In addition, the phantom 3 is positioned relative to the cameras 1 and 2 such that they can capture the marker patches 5 of the phantom. Once step S1 has been performed, the method of the present invention can be carried out.

In step S2, the computer 7 controls the lamp 13 to emit thermal radiation onto the phantom 3. The thermal radiation heats the carrier part 4 and the marker patches 5 of the phantom 3. Due to the different heat capacities of the carrier part 4 and the marker patches 5 and the thermal insulation therebetween, the carrier part 4 and marker patches 5 have different temperatures.

In step S3, the phantom 3 is captured by both the first camera 1 and the second camera 2. This means that the first camera 1 captures a thermal image of the phantom 3 and the second camera 2 generates a 3D point cloud representing points on the surface of the phantom 3. In particular, a light source of the second camera 2 emits a light pattern onto the phantom 3 and the second camera 2 analyzes the pattern of the reflected light to determine distances of points on the phantom 3. The second camera typically generates the 3D point cloud as a set of 3D coordinates in the reference system of the second camera. The 3D coordinates are typically x, y and z coordinates, wherein the z coordinate represents a depth direction of the second camera 2. The x, y and z axes constitute an orthogonal coordinate system.

In step S4, the thermal image captured by the first camera 1 is analyzed. This means that the locations of the marker patches 5 are identified in the thermal image. This in particular means determining the locations of the marker patches 5, in particular of the centers of the marker patches 5, in the thermal image. The locations of all identified marker patches 5 are then commonly referred to thermal marker locations. Due to the intrinsic parameters of the first camera 1, every location of a marker patch 5 in the thermal image has an associated line in space on which the corresponding marker patch 5 lies. This line in space is defined with respect to the first camera 1. Due to their temperature difference, the marker patches 5 can be clearly distinguished from the carrier part 4 in the thermal image.

In step S5, the 3D point cloud generated by the second camera 2 is analyzed. This means that the marker patches 5 are identified in the 3D point cloud. Identifying a marker patch 5 in the 3D point cloud means finding the location of the marker patch 5, in particular of the center of the marker patch 5, in space, defined in a reference system of the second camera 2. Step S5 results in 3D marker locations representing the locations of the found marker patches 5, for example in terms of a set of three-dimensional coordinates. Details of step S5 will be explained later.

In step S6, the relative position between the first camera 1 and the second camera 2 is determined. This is for example achieved by applying a Perspective-n-Points algorithm on the thermal marker locations and the 3D marker locations. The Perspective-n-Points algorithm finds a position of the first camera 1 relative to the second camera 2 such that simulated locations of the marker patches 5 in a simulated thermal image match the locations represented by the thermal marker locations, either exactly or as closely as possible. The simulated locations are calculated by projecting the 3D marker locations into the image plane of the first camera 1, considering an assumed relative position and the intrinsic parameters of the first camera 1.

The relative position between the cameras 1 and 2 establishes the positions of the lines corresponding to the thermal marker locations, which are originally defined relative to the first camera 1, in the reference system of the camera 2. The PnP algorithm finds a relative position such that the 3D marker locations lie on those lines. This is facilitated by the optional step of establishing a one-to-one correspondence of the markers found in the thermal image and the markers found in the 3D point cloud, which means a one-to-one correspondence between every one of the thermal marker locations with one of the 3D marker locations. It is then known which one of the 3D marker locations must lie on which line corresponding to the thermal marker locations.

In step S7, it is determined whether or not the quality of the found relative position is sufficient, which means that the deviation of the found relative position between the first camera 1 and the second camera 2 and the correct relative position is below a predetermined threshold. A suitable metric is the root mean square of the pair-wise distances between the thermal marker locations and the corresponding virtual locations explained above. The found relative position is good enough if this root mean square is below a predetermined threshold.

If the quality is not good enough, then the process returns to step S3, where the phantom 3 is captured again using both the first camera 1 and the second camera 2. Steps S4 to S7 are then repeated with the new thermal image and the new 3D point cloud.

If it is determined in step S7 that the quality is good enough, then the computer 7 ends the emission of thermal radiation by the lamp 13 in step S8 and the relative position is output in step S9, for example to a computer or a software which analyzes the output of the first camera 1 and/or the second camera 2 during a medical procedure.

Figure 5:
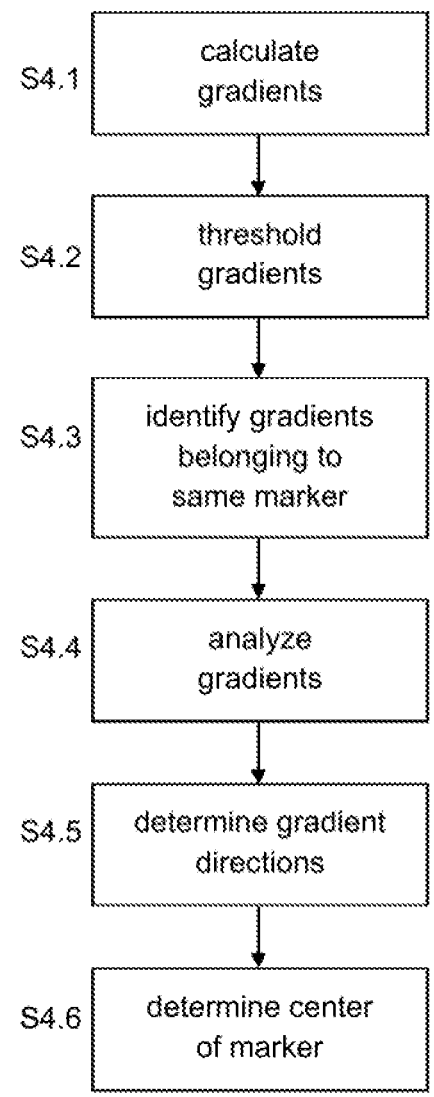

FIG. 5 shows a detailed flowchart of the step S4 of analyzing the thermal image in FIG. 4.

In step S4.1, a gradient is calculated for each one of the pixels of the thermal image. In the present example of the thermal image being a gray scale image, a current pixel, which is a pixel for which the gradient is currently being calculated, has a particular gray value. A most different pixel among the up to eight neighboring pixels of the current pixel is identified, wherein the gray value of the most different pixel is most different from the gray value of the current pixel among all neighboring pixels. The gradient of the current pixel is then the absolute difference between the gray values of the current pixel and the most different pixel.

In optional step S4.2, the gradients found in step S4.1 are thresholded. This means that gradients below a predetermined threshold are discarded. As a result, only gradients indicating a minimum temperature difference are maintained.

In step S4.3, gradients belonging to the same marker patch 5 are identified. Two gradients are for example considered to belong to the same marker patch 5 if their distance in the thermal image is below a predetermined distance threshold. All gradients identified as belonging to the same marker are referred to as a set of gradients. In one implementation, the set of gradients is grown from a seed gradient until there are no more gradients within the distance threshold.

In optional step S4.4, the set of gradients is discarded if it comprises less than a predetermined number of gradients, such as 2, 5, 10 or 20 gradients. This removes sets of gradients which do not belong to an actual marker patch 5, but are rather caused by noise, or sets of gradients for which the center of the corresponding marker patch 5 cannot be reliably determined.

In step S4.5, the directions of the gradients in the set of gradients are determined. The direction of a gradient is the direction in which the gradient is the strongest, which means the direction in which the strongest change of gray values occurs.

In step S4.6, the center of a marker patch 5 corresponding to the set of gradients is determined.

Steps S4.3 to S4.6 are repeated until no more marker patches 5 can be identified in the thermal image and/or no more centers of marker patches 5 in the thermal image can be determined.

Figure 6:
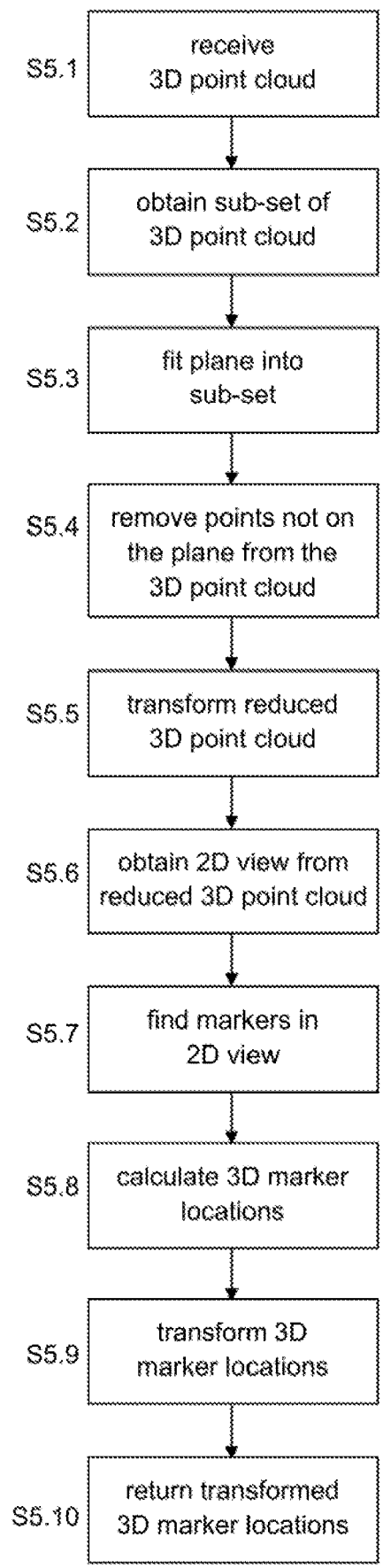
FIG. 6 a detailed flow chart of analyzing the 3D point cloud,
FIG. 7 a reduced and transformed version of the 3D point cloud.

FIG. 6 shows a detailed flowchart of the step S5 of analyzing the 3D point cloud in FIG. 4.

In step S5.1, the 3D point cloud is received.

In optional step S5.2, a sub-set of the 3D point cloud is obtained. The sub-set of the 3D point cloud only comprises points lying on the planar surface of the phantom 3, which includes points on the surface of the marker patches 5. However, it is not necessary that the sub-set contains all points on the planar surface.

One implementation of step S5.2 assumes that the phantom 3 is placed in a predetermined location relative to the second camera 2. Points on the planar surface then lie in a predetermined range of the x and y coordinates of the reference system of the second camera 2. Points in this range then constitute the sub-set of the 3D point cloud.

It is further possible to optionally grow this sub-set by adding neighboring points of the 3D cloud which lie in the plane defined by the points within said range. A point might be considered as lying in the plane if its distance to the plane is below a predetermined threshold as explained with reference to step S5.4 below.

The carrier part 4 of the phantom 3 might have a boundary around it which has the same optical property as the marker patches 5. The growth of the sub-set can be stopped if this boundary is reached.

In step S5.3, a plane is fitted into the 3D point cloud or, if applicable, the sub-set of the 3D point cloud obtained in step S5.2, in addition, the orientation of a normal to the found plane is calculated. Any suitable algorithm for fitting a plane into a set of points can be used.

In step S5.4, points which do not lie in the plane are removed from the original 3D point cloud. It shall be noted that not only points which lie exactly in the plane are maintained in the 3D point cloud, but also points with a distance to the plane which is below a certain threshold. This threshold can be an absolute threshold, such as 1 mm, 2 mm, 3 mm, 4 mm, or 5 mm. The threshold can also be a relative threshold which is defined in relation to the size of the planar surface, for example the square root of the size of the planar surface. The result of step S5.4 is a reduced 3D point cloud.

In step S5.5, the reduced 3D point cloud is transformed, in particular rotated. In particular, the reduced 3D point cloud is transformed such that the normal to the plane found in step S5.3 is parallel to the z-axis of the reference system of the second camera 2. In the case of a structured light camera as the second camera 2, the x- and y-axes of the camera's reference system lie in the image plane of the structured light camera and the z-axis is perpendicular thereto. With the transformation performed in step S5.5, all points in the reduced 3D point cloud have basically or exactly the same distance to the second camera 2.

Figure 7:
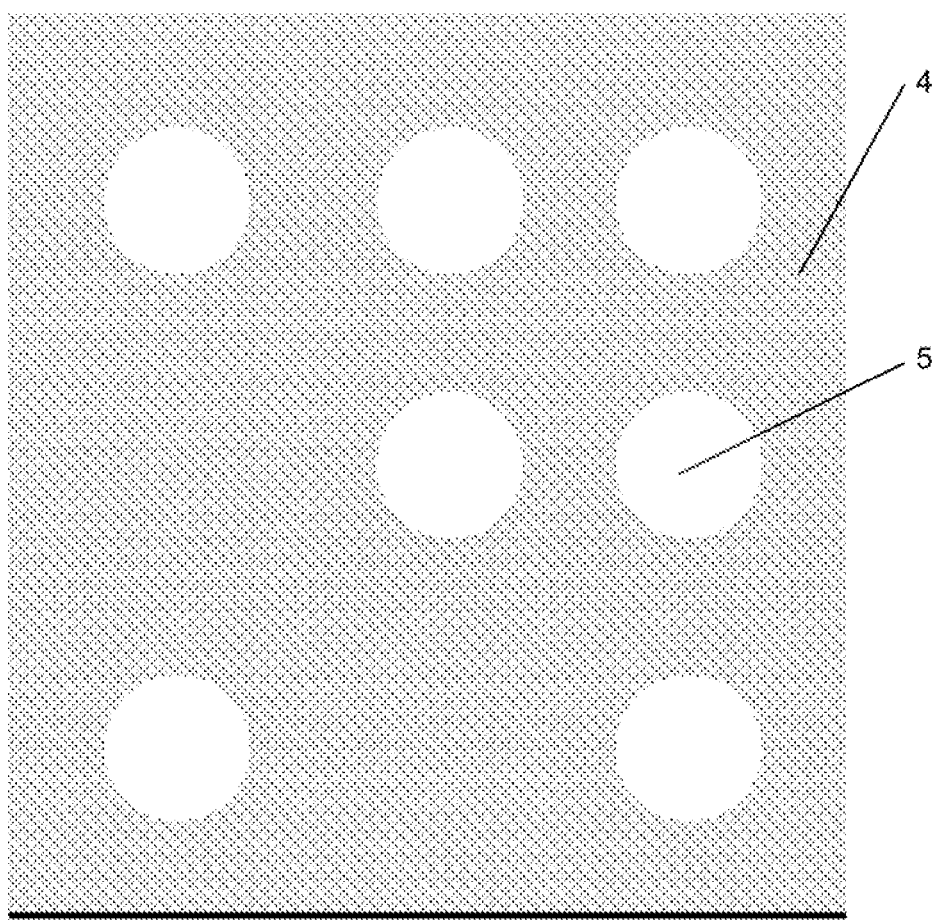

FIG. 7 shows an example of a reduced and transformed 3D point cloud. There are only points corresponding to the carrier part 4 of the phantom 3. At the locations of the marker patches 5, there are no points in the reduced and transformed version of the 3D point cloud because the black marker patches 5 have not reflected enough light back to the second camera 2, while the white carrier part 4 has.

In step S5.6, a 2D view is obtained from the reduced and transformed 3D point cloud. The 2D view is, for example, a 2D grey-scale image, wherein the grey value of a pixel is determined from one or more corresponding points in the reduced and transformed 3D point cloud. This means mapping the 3D coordinates of the points in the reduced and transformed 3D point cloud into 2D coordinates in the 2D view and a grey value.

Since all points of the reduced and transformed 1D point cloud have basically) the same distance to the second camera 2, the corresponding pixels in the 2D view have the same or almost the same grey value. However, pixels corresponding to the marker patches 5 are either black or white, depending on the mapping of the distance to the grey values. The 2D view can also be binarized, such that pixels corresponding to the carrier part 4 are white and pixels corresponding to the marker patches 5 are black, or vice versa.

The markers are then identified in the 2D view in step S5.7. The same algorithm as in step S4 can be used. The results of step S5.7 are the locations of the markers, in particular of the centers of the markers, in the image plane of the 2D view.

In step S5.8, the locations of the markers found in step S5.7 are transformed into 3D marker locations. This involves an inverse mapping to the mapping performed in step S5.6. In particular, the 2D coordinate of a location is mapped to the x and y coordinates in the reference system of the second camera. The z coordinate for example corresponds to the z coordinate of one of the points in the reduced and transformed 3D point cloud or the average of the z coordinates of two or more points in the reduced and transformed 3D point cloud.

The 3D marker locations resulting, from step S5.8 represent the centers of the "holes" in the reduced and transformed 3D point cloud. In step S5.9, those 3D marker locations are transformed, using the inverse of the transform used in step S5.5. This means that the 3D marker locations are transformed to the original position of the 3D point cloud relative to the second camera 2. In step S5.10, the transformed 3D marker positions are returned as the 3D marker locations.

Figure 8:
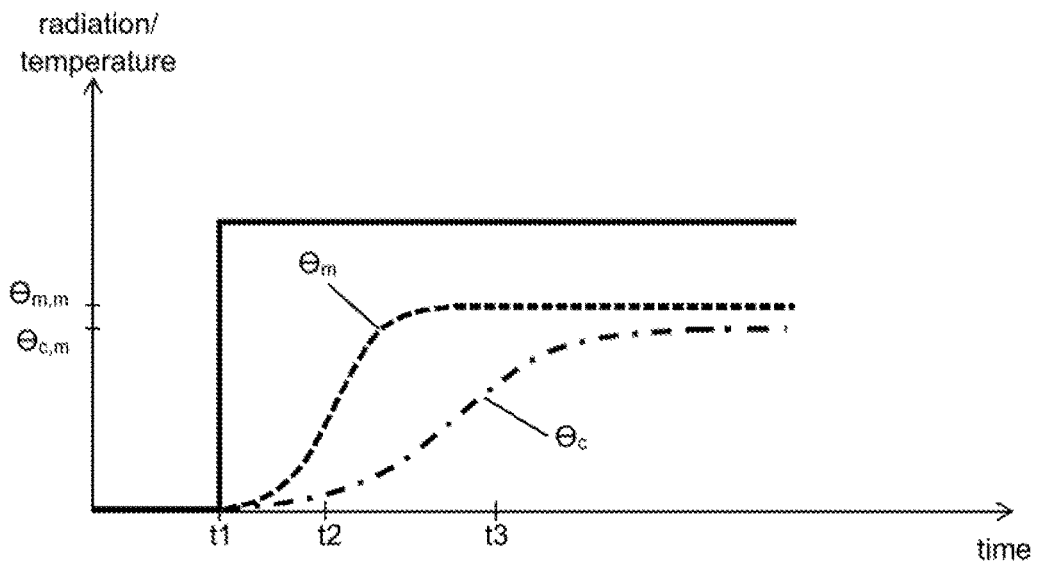
FIG. 8 the temperature of a carrier part and marker patches over time,
FIG. 9 the temperature of a carrier part and marker patches over time with periodic irradiation,
FIG. 10 the temperature of a carrier part and marker patches over time for a pre-heated phantom,
FIG. 11 an exemplary marker sticker, and
FIG. 12 an exemplary application of marker stickers.

FIG. 8 shows the temperatures of the carrier part 4 and the marker patches 5 over time. $\Theta_m$ denotes the temperature of the marker patches 5 and $\Theta_c$ denotes the temperature of the carrier part 4.

At t1, the computer 7 turns on the lamp 13, which then emits thermal radiation onto the phantom 3. The thermal radiation heats the carrier part 4 and the marker patches 5 at different rates depending on their heat capacity and their color. The marker patches 5 approach their maximum temperature $\Theta_{m,m}$ faster than the carrier part 4 approaches its maximum temperature $\Theta_{c,m}$. This means that there is a period of time, which is the period between t2 and t3 in FIG. 8, in which the temperature difference between the marker patches 5 and the carrier part 4 is large enough to reliably detect the marker patches 5 in the thermal image.

Figure 9:
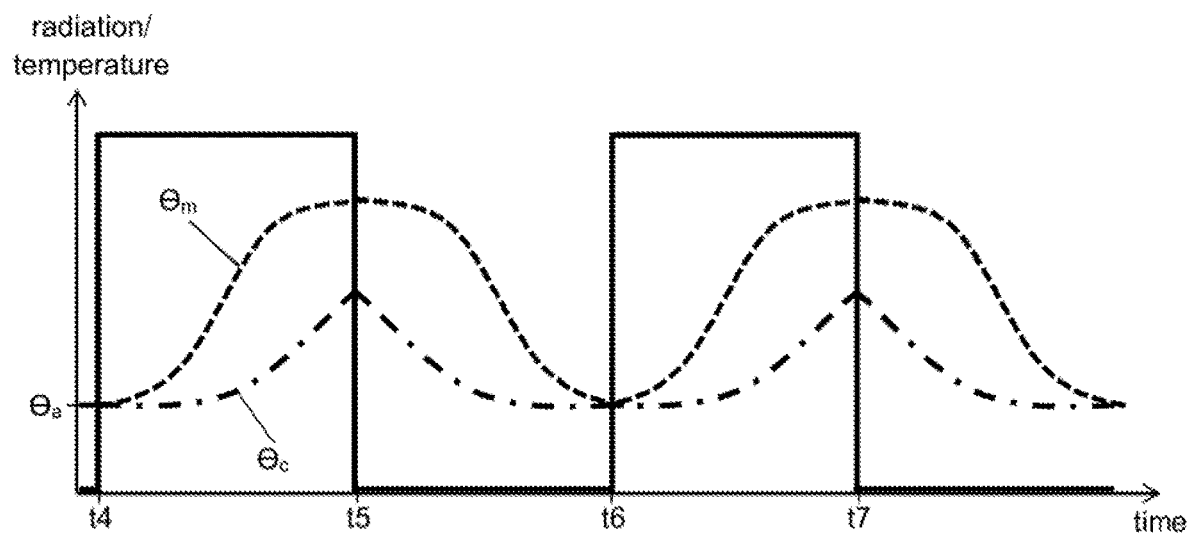
Figure 10:
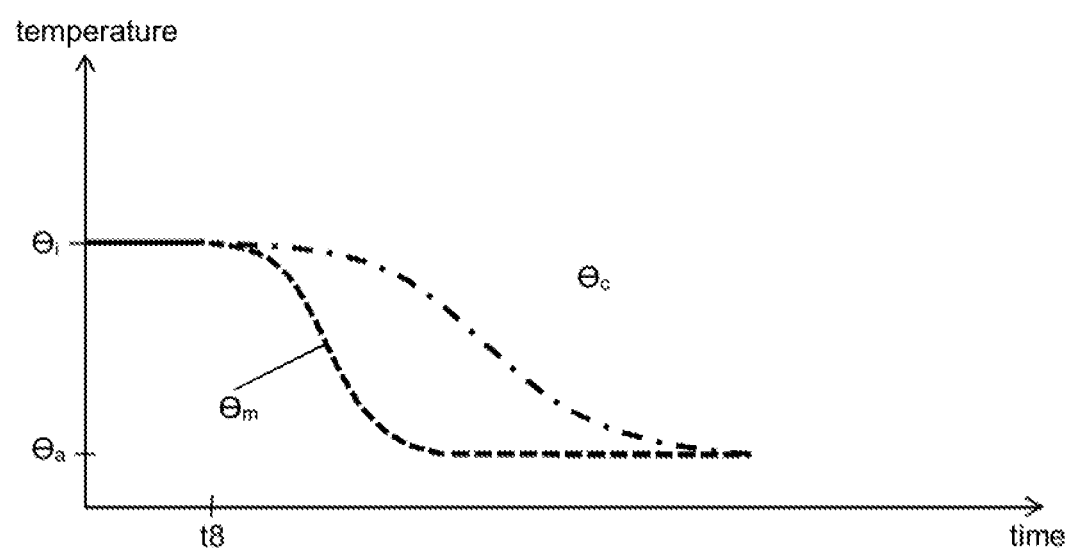

FIG. 9 shows the temperatures of the carrier part 4 and the marker patches 5 over time when the computer 7 periodically varies the intensity of the thermal radiation emitted by the lamp 13. In the example shown, the computer periodically turns the lamp 13 on and off.

Initially, the marker patches 5 and the carrier part 4 are at an ambient temperature $\Theta_a$, which is the air temperature at the location of the phantom 3. At t4, the computer 7 turns on the lamp 13 and the temperatures of the marker patches 5 and the carrier part 4 start rising. Once again, the temperatures rise at different rates, leading to a temperature difference between the marker patches 5 and the carrier part 4.

At t5, the computer 7 turns off the lamp 13 and the temperatures of the marker patches 5 and the carrier part 4 start falling towards the ambient temperature $\Theta_a$. This cycle is repeated, wherein the computer 7 turns the lamp on at t6 and off at t7 and so on.

The periodic irradiation of the phantom 3 with thermal energy has two main advantages. The first advantage is that the temperature of the marker patches 5 and temperature of the carrier part 4 differ significantly over a large ratio of time. The second advantage is that the temperatures of the marker patches 5 and the carrier part 4 periodically change over time, which can be utilized in the analysis of a sequence of thermal images captured by the first camera 1 over time.

FIG. 9 shows the temperatures of the carrier part 4 and the marker patches 5 over time when the phantom 3 is pre-heated to an initial temperature $\Theta_i$, for example in an oven or any suitable heating device. At t8, the phantom 3 is taken out of the oven and the temperature of the marker patches 5 and the temperature of the carrier part 4 start falling towards the ambient temperature $\Theta_a$. Since the temperature fall at different rates, there is a temperature difference between the marker patches 5 and the carrier part 4, such that they can be identified in the thermal image of the first camera 1. Instead of being pre-heated, the phantom can be pre-cooled, for example in a fridge. The initial temperature $\Theta_i$ is then lower than the ambient temperature $\Theta_a$, such that the temperatures of the marker patches and the carrier part 4 rise.

In the above embodiments, the marker patches 5 have a heat capacity lower than the one of the carrier part 4. However, it can be higher, such that the rate of temperature change of the carrier part 4 is larger than of the marker patches 5.

Figure 11:
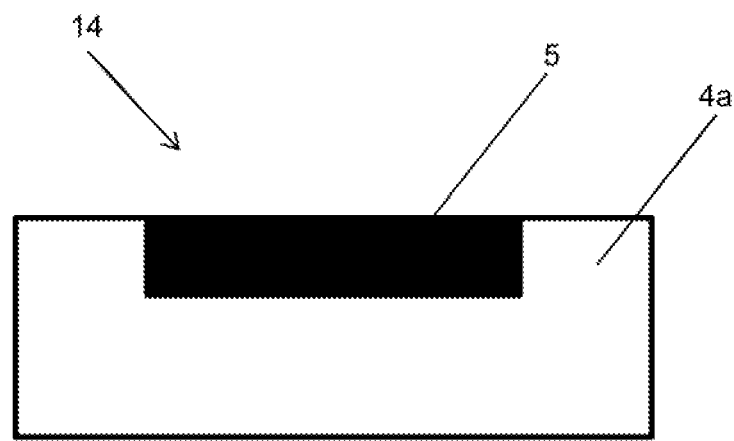

FIG. 11 shows an exemplary marker sticker, or sticker, 14. It consists of a base 4a onto which a marker patch 5 is formed or in which a marker patch 5 is at least partly embedded. In the example shown in FIG. 11, the marker patch 5 and the base 4a form a continuous, smooth surface.

In this example, the base 4a is made of polyethylene terephthalate (PET) with a white, diffuse reflective surface and the marker patch 5 is made of black closed cell neoprene foam. However, any other suitable combination of materials can be used.

The marker patch 5 heats up when being irradiated by the lamp 13 and absorbs the light emitted by the second camera 2. The base 4a reflects much more of the radiation emitted by the lamp 13 and distributes the absorbed radiation internally, such that the base 4a heats up slower than the marker patch 5. This makes the marker patch 5 hotter in the thermal image captured by the first camera 1. The marker patch 5 does not reflect the light emitted by the second camera 2 back to the second camera 2, such that it appears as a hole in the 3D point cloud.

Figure 12:
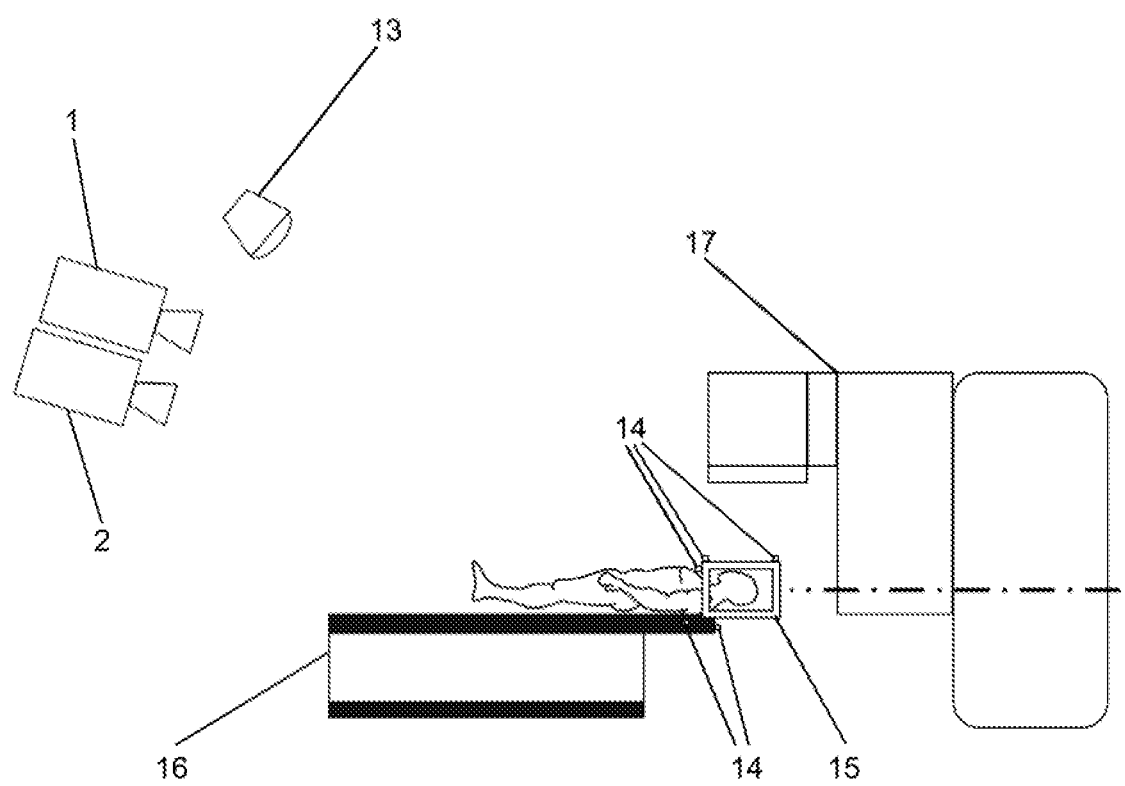

FIG. 12 shows an exemplary application of marker stickers 14 as shown in FIG. 11. Three marker stickers 14 are attached to a head rest 15 which immobilizes the head of a patient lying on an operating room table 16. Two further marker stickers 14 are attached to the operating room table 16. The operating room table 16, the head rest 15 and the bases 4a of the marker stickers 14 now form the carrier part of an ad-hoc phantom.

A linear accelerator 17 is provided for performing radio therapy on the patient. The cameras 1 and 2 are used for monitoring the position of the patient, in order to secure that the operating room table 16 is properly positioned relative to the linear accelerator 17.

An initial calibration for obtaining the relative position between the first camera 1 and the second camera 2 has been made using a hybrid phantom 3 as described above. However, any other approach for determining the initial calibration can be used. One such approach uses a phantom and/or a method as described in the International Patent Application having the application number PCT/EP2017/072360 or in the paper "3D Thermal Imaging: Fusion of Thermography and depth Cameras" by J. Rangel, S. Soldan and A. Kroll. Another approach geometrically measures the relative position between the cameras, for example using devices for measuring distances and/or angles or a tracking system, such as an optical or electromagnetic tracking system.

During treatment of the patient, this calibration is verified using the marker stickers 14. As explained above, the locations of the marker stickers 14 in the thermal image generated by the first camera 1 and in the 3D point cloud generated by the second camera 2 can be determined and used for verifying the calibration.

For performing the calibration, the lamp 13 emits radiation which heats the marker patches 5 faster than the bases 4a. A short illumination of the lamp 13, such as for 2 seconds, for example, results in a thermal contrast between the marker patches 5 and the bases 4a. This can even be performed during treatment of the patient, such that it is not necessary to interrupt the treatment for the verification of the calibration.

Since the actual relative position between the first camera 1 and the second camera 2 is typically very close to the stored relative position determined during the initial calibration (or the last verification), the stored relative position can be used as a starting point or condition for determining the actual relative position. This means that the marker stickers 14 can be attached to arbitrary structures in the field of view of the two cameras.

The invention claimed is:

1. A method for determining the relative position between a first camera and a second camera, wherein the first camera is a thermal camera and the second camera is a 3D camera that emits light onto a hybrid phantom and analyzes reflected light from the hybrid phantom, thus generating a 3D point cloud representing points on a surface of the hybrid phantom, the hybrid phantom comprising a carrier part that carries a plurality of marker patches such that a thermal insulation resides between each of the plurality of marker patches and the carrier part, wherein at least a part of the carrier part has one of a first property and a second property, and each of the plurality of marker patches are constructed of a solid material having the other one of the first property and the second property, wherein the first property is being reflective of light emitted by the second camera thus reflecting the light emitted by the second camera back to the second camera, and wherein the second property is reflecting less of the light emitted from the second camera than the first property, the method comprising:

generating, by an associated temperature difference generating means, a temperature difference between each of the plurality of marker patches and the carrier part of the hybrid phantom capturing a thermal image of the hybrid phantom using the first camera;

identifying an edge of each of the plurality of marker patches of the hybrid phantom in the thermal image;

identifying locations of each of the plurality of marker patches from the identified edges, thus generating thermal marker locations;

capturing a 3D point cloud of the hybrid phantom using the second camera identifying locations of each of the plurality of marker patches from the 3D point cloud, thus generating 3D marker locations; and determining the relative position between the first camera and the second camera from the thermal marker locations and the 3D marker locations.

2. The method of claim 1, wherein the identifying the edge of a marker patch and identifying the location of a marker patch comprise, for each of the plurality of marker patches, finding two or more edge pixels lying on the boundary of the marker patch, calculating a direction of a gradient for each found edge pixel, and calculating the location of the marker patch from the directions of the gradients.

3. The method of claim 1, wherein the identifying the locations of each of the plurality of marker patches from the 3D point cloud, thus generating 3D marker locations comprises:

calculating phantom position data describing the position of the hybrid phantom relative to the second camera from the 3D point cloud, obtaining marker data representing the locations of each of the plurality of marker patches on the hybrid phantom, and calculating the location of each of the plurality of marker patch from the phantom position data and the marker data.

4. The method of claim 1, wherein:

the temperature difference between each of the plurality of marker patches and the carrier part is generated by emission of electromagnetic radiation onto the hybrid phantom, the emission of the electromagnetic radiation has a varying intensity over time, a plurality of thermal images is captured over time, a Fourier transformation of the plurality of thermal images is performed, thus obtaining image data in the frequency domain, a frequency filter is applied to the image data in the frequency domain, thus generating filtered image data in the frequency domain, an inverse Fourier transformation is performed on the filtered image data in the frequency domain, thus obtaining filtered image data in the time domain, and the edges of each of the plurality of marker patches are identified in the filtered image data in the time domain.

5. The method of claim 4, wherein the emission of the electromagnetic radiation is caused to have the varying intensity over time with a predetermined frequency, and the frequency filter comprises a low-pass filter and the cutoff frequency of the low-pass filter is set to the predetermined frequency or higher.

6. A system, comprising:

a first camera, the first camera being a thermal camera;

a second camera, the second camera being a 3D camera;

a hybrid phantom that includes:

a carrier part that carries a plurality of marker patches, constructed of a solid material, with thermal insulation resides between each of the plurality of marker patches and the carrier part, wherein at least a part of the carrier part has one of a first property or a second property and each of the plurality of marker patches has the other one of the first property or the second property, the first property being reflective of light emitted by the second camera and the second property being less reflective of the light emitted by the second camera than the first property;

a temperature difference generating means configured to generate a temperature difference between each of the plurality of marker patches and the carrier part of the hybrid phantom, a computer having at least one processor, the processor being configured to:

capture a thermal image of the hybrid phantom using the first camera;

identify an edge of each of the plurality of marker patches of the hybrid phantom in the thermal image;

identify locations of each of the plurality of marker patches from the identified edges, thus generating thermal marker locations;

capture a 3D point cloud of the hybrid phantom using the second camera;

identify locations of each of the plurality of marker patches from the 3D point cloud, thus generating 3D marker locations; and determine the relative position between the first camera and the second camera from the thermal marker locations and the 3D marker locations.

7. The system of claim 6, wherein, to identify the edge of a marker patch and the location of the marker patch, for each of the plurality of marker patches, the processor is further configured to:

find two or more edge pixels lying on a boundary of the marker patch;

calculate a direction of a gradient for each edge pixel found; and calculate the location of the marker patch from the directions of the gradients.

8. The system of claim 6, wherein to identify the locations of each of the plurality of marker patches from the 3D point cloud and generating the 3D marker locations, the processor is further configured to:

calculate phantom position data describing the position of the hybrid phantom relative to the second camera from the 3D point cloud, obtain marker data representing the locations of each of the plurality of marker patches on the hybrid phantom, and calculate the location of each of the plurality of marker patches from the phantom position data and the marker data.

9. The system of claim 6, wherein the temperature difference generating means emits electromagnetic radiation to generate the temperature difference.

10. The system of claim 9, wherein the electromagnetic radiation emitted by the temperature difference generating means varies over time with a predetermined frequency, and wherein the processor is further configured to:

capture a plurality of thermal images via the first camera;

obtain image data in a frequency domain by performing a Fourier transformation of the plurality of thermal images;

apply a frequency filter to the image data to generate filtered image data in the frequency domain;

obtain filtered image data in the time domain by performing an inverse Fourier transformation of the filtered image data; and identify edges of each of the plurality of marker patches based on the filtered image data in the time domain.

11. The system of claim 10, wherein the frequency filter is a low-pass filter with a cutoff frequency set to the predetermined frequency or higher.

* * * * *